Sept. 4, 1934.  J. E. SEEDERER  1,972,603
WEIGHING DEVICE
Filed Feb. 17, 1930  2 Sheets-Sheet 1
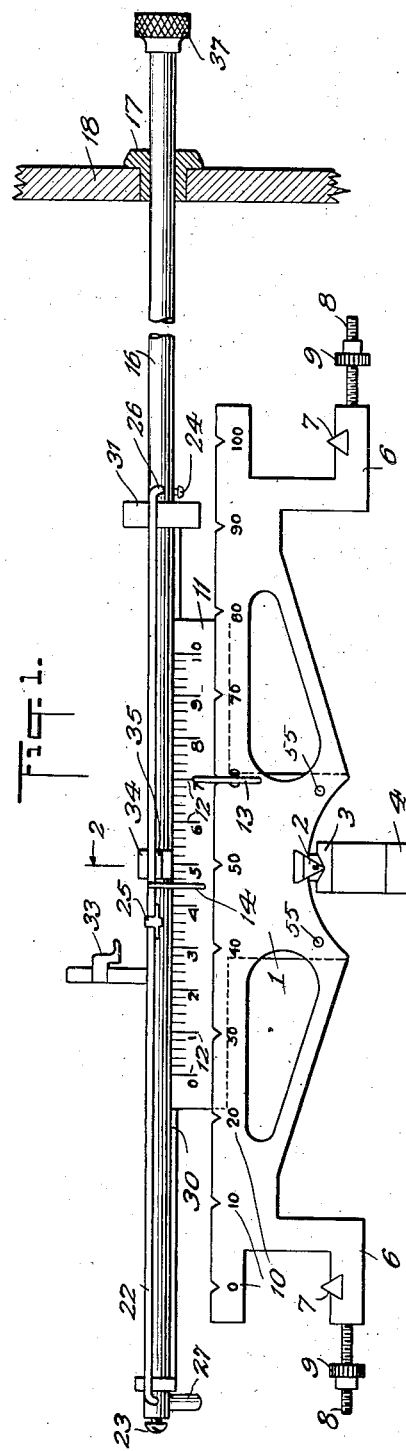
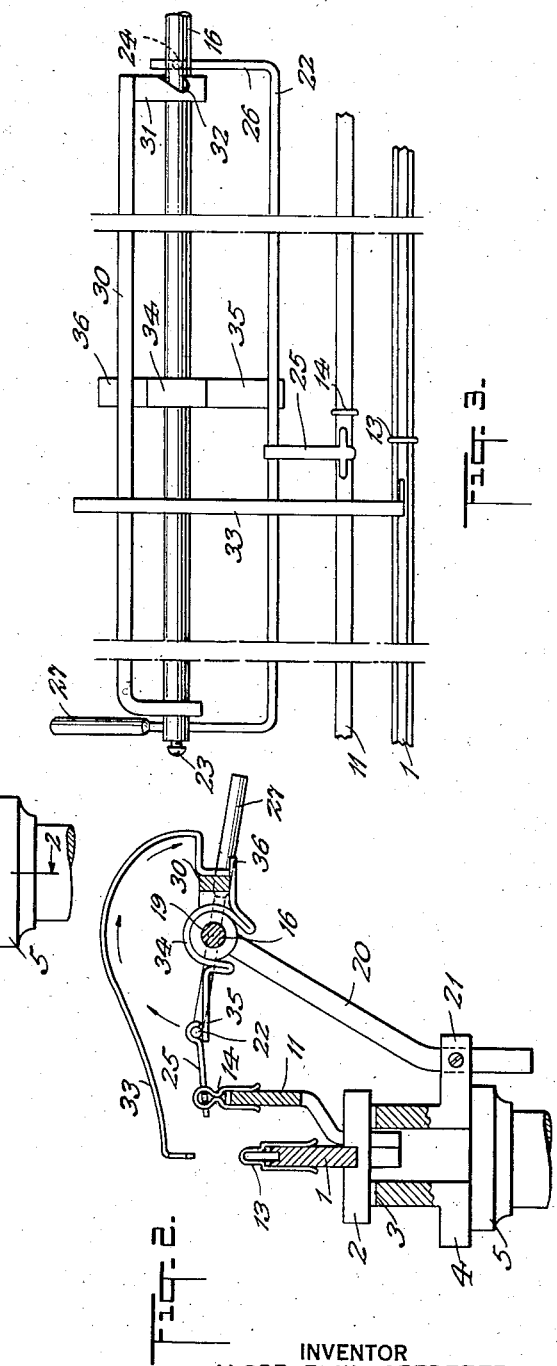
INVENTOR
JACOB EMIL SEEDERER
BY
J. S. Wooster
ATTORNEY Sept. 4, 1934.  J. E. SEEDERER  1,972,603
WEIGHING DEVICE
Filed Feb. 17, 1930   2 Sheets-Sheet 2
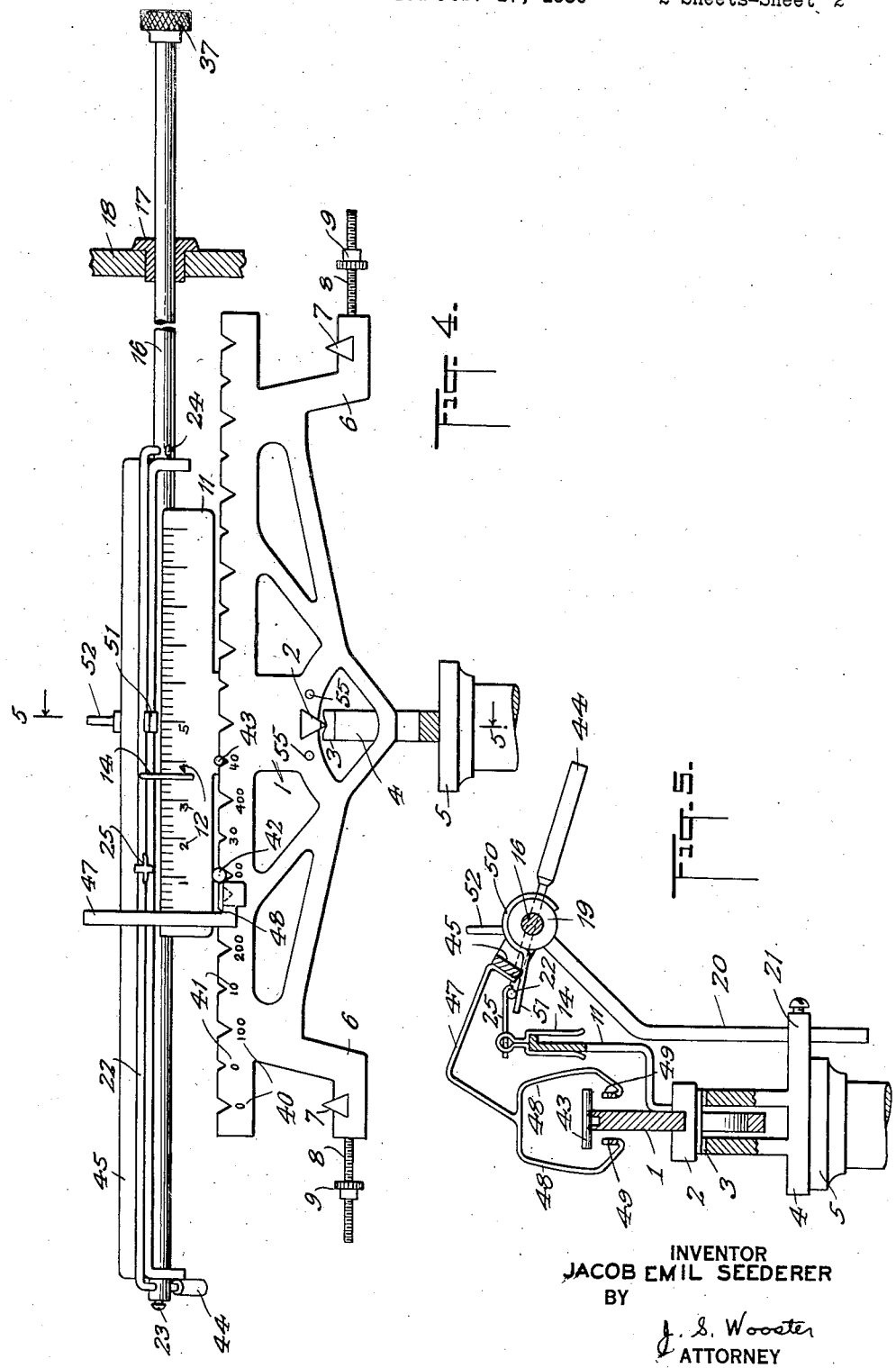
INVENTOR
JACOB EMIL SEEDERER
BY
J. S. Wooster
ATTORNEY Patented Sept. 4, 1934

1,972,603

UNITED STATES PATENT OFFICE 1,972,603

WEIGHING DEVICE

Jacob Emil Seederer, Jersey City, N. J., assignor to Seederer-Kohlbusch, Inc., Jersey City, N. J., a corporation of New Jersey Application February 17, 1930, Serial No. 429,013

15 Claims. (Cl. 265—54)

This invention relates to weighing devices and particularly to that class of weighing devices known as balances.

An object of this invention is to provide a balance of great sensitivity, economical to make, and capable of weighing with great accuracy quickly and with a minimum of effort on the part of the operator.

A further object is to provide a balance beam adapted for accurate weighing with the complete elimination of the fractional weights ordinarily placed on the pans of a balance to effect a poise in weighing.

A further object is to provide an encased balance in which a plurality of weights can be shifted along the balance beam from outside the case by means of a single sliding rod.

Another object is to provide a graduated balance beam so constructed to carry movable poises as to give weight readings of the greatest accuracy without the use of fractional weights in the pans while employing graduations sufficiently spaced apart to be readily discernible to the operator.

A further object is to provide a balance having mechanical means to shift poises along its beam employing a minimum of complicated parts.

My invention comprises a pivoted balance beam made up of a plurality of parallel graduated beams held in fixed relation to each other and having a common pivot, poises adapted to be moved along said beams, and means for shifting said poises operated by a single sliding rod mounted for rotation about its longitudinal axis and extending beyond the balance case whereby the poises may be shifted from outside the case.

In the accompanying drawings two preferred embodiments of the invention are shown wherein, Fig. 1 is a front elevation of a balance illustrating the invention, a portion of the case being shown in section and parts immaterial to the invention being broken away.

Fig. 2 is a section on the line 2—2 of Fig. 1.

Fig. 3 is a plan view of the poise shifting device shown in Fig. 1, and part of the balance beam.

Fig. 4 is a view similar to Fig. 1 of a modified form of the invention.

Fig. 5 is a section on the line 5—5 of Fig. 4.

Referring specifically to Figs. 1, 2, and 3, 1 is the primary beam of a balance beam, carrying knife edge 2 resting on knife edge bearing 3 supported by the knife edge bearing support 4 mounted on the usual pedestal 5. Primary beam 1 is provided with depending arms 6 on each side thereof carrying knife edges 7 adapted to support the yokes of weighing pans (not shown) in the usual manner. The arms 6 are each provided with a laterally extending threaded stem 8 on which are disposed correspondingly threaded counter weights 9. The front face of beam 1 is provided with graduations 10 throughout substantially its whole length and the beam is preferably channeled to afford a better seat for riders.

Rigidly attached to or made as an integral part of primary beam 1 is secondary beam 11 extending parallel thereto and positioned slightly to the rear and higher. The front face of this beam is provided with graduations 12 which show above the upper edge of primary beam 1. Riders 13 and 14 are adapted to rest on beams 1 and 11, respectively, and cooperate with the graduations thereon.

A slidable rod 16 is mounted for rotation about its longitudinal axis by being passed through bushing 17 in the side of the casing 18 and through collar 19 supported in back of and slightly above beam 1 by rod 20 fixedly mounted in the rearwardly extending portion 21 of support 4. Elongated U-shaped member 22 extending parallel to the rod 16 has one end adjustably mounted in rod 16 by means of set screw 23 adjacent its inner end and the other end adjustably mounted in rod 16 by means of set screw 24 intermediate bushing 17 and collar 19. U-shaped member 22 carries rider hook 25 intermediate its ends, said rider hook being adapted to engage and move rider 14. A counter weight 27 is carried at one end of member 22 and is adapted to swing up member 22 and its associated rider hook 25 to a vertical position when sliding rod 16 is released.

A second elongated U-shaped member 30 extending parallel to rod 16 is slidably and rotatably mounted on rod 16 by passing said rod through holes provided in the ends of the arms of said member 30, one of said ends engaging the rod 16 between collar 19 and the inner end of the rod and the other end, designated by reference numeral 31, of the U-shaped member 30 engaging rod 16 intermediate bushing 17 and collar 19. The end 31 of U-shaped member 30 is widened out and provided with a diagonal slot 32 adapted to receive the adjacent arm 26 of U-shaped member 22. A curved rider hook 33 is mounted on U-shaped member 30 at approximately its center and is adapted to engage and move rider 13. A bracket 34 is sprung on collar 19 and adjustable thereon and has a forwardly projecting stop 35 adapted to function as a stop and guide for U-shaped member 22 when that member is in such position that the rider hook 25 is at the correct level to engage the eye of rider 14, the position shown in Figs. 1, 2, and 3, and a rearwardly extending stop 36 adapted to function as a stop and guide for U-shaped member 30 when said member 30 is in such position that its rider hook 33 will clear rider 13, the position shown in Figs. 1, 2, and 3. The rod 16 is provided at its outer end with a knurled knob 37 to facilitate its manipulation.

The U-shaped member 30 is of sufficient weight to overbalance its rider hook 33 so that, due to gravity, the member 30 in its normal position shown in Figs. 1, 2, and 3, will rest on stop 36 in which position its rider hook 33 clears rider 13 and also allows U-shaped member 22 to be swung up and down by rotation of rod 16 for manipulation of rider 14 without interference from U-shaped member 30 (see Fig. 2).

As clearly shown in Fig. 3, the entrance to slot 32 lies on the upper side of rod 16 when U-shaped member 30 is in its normal position. This position of the entrance to slot 32 is important inasmuch as rod 16 can be rotated sufficiently to lift rider hook 25 above rider 14 or to pick rider 14 off secondary beam 11 when rider hook 25 has engaged it and to shift it to some other position on beam 11 without bringing the adjacent arm 26 of U-shaped member 22 far enough back to enter slot 32 and engage U-shaped member 30.

To manipulate rider 13, rod 16 is rotated clockwise (Fig. 2) until the arm 26 of U-shaped member 22 has passed beyond the entrance to slot 32. Rod 16 is then moved to the left, looking at Fig. 3, and rotated counterclockwise (Fig. 2) until the arm 26 enters slot 32. Upon further turning rod 16 U-shaped member 30 will also be turned bringing rider hook 33 down toward primary beam 1. The end of slot 32 against which the arm 26 abuts is positioned so that rider hook 33 can be brought to the level of the eye of rider 13 without lowering rider hook 25 sufficiently to touch rider 14, thus enabling the rider 13 to be manipulated independently of rider 14. Due to the weight of U-shaped member 30, when rod 16 is now turned clockwise (Fig. 2), U-shaped member 30 will also turn clockwise as far as permitted by the arm 26 of U-shaped member 22 or until it abuts against the stop 36 of bracket 34, thus causing rider hook 33 to swing up with rider 13. Rider hook 33 can be moved along beam 1 by sliding rod 16. To disengage U-shaped member 30, rod 16 is turned clockwise (Fig. 2) past the point at which U-shaped member 30 engages stop 36, thus withdrawing the arm 26 of U-shaped member 22 from slot 32. Rod 16 is then moved to the right (Fig. 3) and turned counterclockwise (Fig. 2) until the arm 26 has passed beyond the entrance to slot 32, thereby disengaging U-shaped member 30. It is understood that in sliding rod 16 back and forth to manipulate rider 14, U-shaped member 30 will also slide back and forth with it, but will rest against stop 36 in which position its rider hook 33 will clear rider 13.

As shown in Fig. 1, it is preferred to have the graduations extend for substantially the whole length of the beams and it is therefore necessary to move the riders to any point on the beams. For this reason the distance between the two points at which U-shaped member 30 engages rod 16 is substantially equal to the length of primary beam 1, thereby enabling rider hook 33 to be moved to any position along beam 1 without interference from collar 19. As shown in Fig. 1, secondary beam 11 is shorter than primary beam 1 but, if it is to be made longer, the distance between the two points at which U-shaped member 22 is mounted on rod 16, would have to be increased to allow rider hook 25 to be moved to any point along beam 11. It would not be necessary to increase the length of U-shaped member 30 however.

The graduations on the two beams may be in any units of weight but generally will be in the metric system in this type of balance. As shown in Fig. 1, if the graduations are in the metric system, the graduations 10 will usually represent tenths of a gram, the numbered graduations 12 on beam 11 hundredths of a gram, and the intermediate graduations 2 milligrams. The number of intermediate graduations can be doubled so that they will represent milligrams or the milligrams can be obtained accurately by estimating the point half way between each graduation. By means of the two riders any weight between a gram and a milligram may be obtained without opening the case of the balance. To illustrate a reading on this double type of beam, the weights in the positions shown in Fig. 1 represent a weight of .644 grams.

Referring now to Figs. 4 and 5, the balance beam comprises primary beam 1 and secondary beam 11 and is essentially the same as the balance beam shown in Figs. 1–3. However, instead of graduations 10 as shown on the beam 1 in Fig. 1, the beam 1 in this modification is provided with two sets of graduations, 40 and 41, the notches in graduations 40 being somewhat deeper than those in graduations 41 and adapted to cooperate with rolling poise 42 larger in size than rolling poise 43 which cooperates with graduations 41. As shown in Fig. 5, the beam 1 is channeled to afford a securer seat for poises 40 and 41.

Rod 16 is slidably mounted by being passed through bushing 17 in the side 18 of the case and collar 19 as in Figs. 1–3. U-shaped member 22 is adjustably mounted on rod 16 and is similar to the corresponding member in Figs. 1–3, carrying a counter weight 44 at one of its ends sufficiently heavy to over balance member 22 and its associated rider hook 25.

In this modification of the invention, in place of U-shaped member 30 having the slotted end 31, a U-shaped member 45 without a slotted end is mounted on rod 16. Member 45 carries at approximately its center a poise shifting member comprising a strip of metal 47 or the like, fastened to member 45 and extending forwardly and upwardly sufficiently to avoid secondary beam 11 and its rider 14 and then downwardly toward beam 1 being formed into two downwardly projecting arms 48 on either side of beam 1 which are sloped inwardly and then upwardly at their ends. The ends of arms 48 are notched at 49 so that, on raising the ends underneath poise 42 or 43, the poise will seat firmly in the notches. The distance between the ends of arms 48 is made less than the length of poises 42 and 43 which are of substantially equal length and the inwardly sloping portions of arms 48 are made so that the distance between said portions at the level of the notches 49 in the arms 48 is just slightly greater than the length of the poises so that the arms 48, being centered with respect to beam 1, will center the poises if they are off center with respect to beam 1 on lifting same due to the fact that one end of the poise will engage the inwardly sloped portion of one of the arms 48 before the poise is seated in notches 49, thereby shifting the poise laterally until centered on the beam.

A bracket 50 is disposed on collar 19 and is made with a forwardly projecting stop 51 on which U-shaped member 45 normally rests due to gravity and in which position the poise shifting member clears beam 11 and its rider 14 as well as the rolling poises on beam 1. U-shaped member 45 is shown resting on stop 51 in Figs. 4 and 5. The position of this stop 51 is also adjusted so that, when rod 16 is turned until U-shaped member 22 abuts against said stop, the position in which it is shown in Figs. 4 and 5, rider hook 25 is at the level of the eye of rider 14 and, therefore, stop 51 functions as a guide for U-shaped member 22 as well as a stop for U-shaped member 45. The position of the metal strip 47 when U-shaped member 45 is resting against stop 51, is sufficiently above U-shaped member 22 to allow that member to be turned enough for its rider hook 25 to clear rider 14. Due to counter weight 44, U-shaped member 22 will normally abut against strip 47, the weight of U-shaped member 45 being great enough to stop further movement of U-shaped member 22 upward. Therefore, when the whole poise shifting mechanism is in its normal position, the rod 16 can be moved back and forth along the balance beam without touching the various poises. Accidental movement of rod 16 will not disturb the poises.

Bracket 50 is also provided with the stop 52 extending upwardly. On turning rod 16 clockwise (looking at Fig. 5), the U-shaped member 22 will engage and lift U-shaped member 45 and consequently swing the poise shifting member upwardly until it engages one of the poises 42 or 43. The position of stop 52 is adjusted so that when the poise shifting member is high enough to hold the rolling poises clear of beam 1, stop 52 limits further movement of U-shaped member 45. In shifting poises 42 and 43, rod 16 is turned to hold U-shaped member 45 against stop 52 which acts as a guide to assure a clearance between the poises and beam 1 while the poises are being shifted. When the poise shifting member is in position to engage the rolling poises, rider hook 25 is well above rider 14 and therefore the shifting of the rolling poises is independent of rider 14.

As shown in Fig. 4, primary beam 1 carries two sets of graduations, 40 and 41, extending for substantially the full length of the beam. The larger rolling poise 42 is adapted to cooperate with graduations 40 having the deeper notches. Assuming the balance is to be graduated in the metric system, the graduations 40 will usually each represent one tenth grams, using poise 42 to cooperate therewith. The graduations 41 will each represent centigrams, using the lighter poise 43 to cooperate therewith. In this case the numbered graduations 12 on secondary beam 11 will represent milligrams and the intermediate graduations two-tenths milligrams. Thus, by the use of this balance beam and the two rolling poises cooperating with the two sets of graduations on beam 1 and graduations on secondary beam 11 cooperating with rider 14, it is possible to close the balance case after weighing an object to the nearest gram and thereafter determine the weight of the object to the fourth decimal place by manipulation of a single sliding rod. Due to this arrangement of the balance beam and graduations, all fractional weights to be placed in the pans are eliminated and, furthermore, the use of very fine graduations is entirely unnecessary. The poises in the positions shown in Fig. 4, assuming the balance beam to be graduated as above, indicate a weight of 0.3436 grams.

As shown in Figs. 1 and 4, the secondary beam 11 is attached to primary beam 1 at points 55, 55 which are adjacent the common pivot for the two beams and also fairly close to each other. In composite beams of this type using a primary and secondary beam, it is preferred to attach the secondary beam to the primary beam at two points fairly close together so that unequal expansion of the two beams due to temperature changes will have little tendency to create a strain between the two beams. The secondary beam, of course, may be attached at points adjacent its opposite ends to the primary beam but such construction may throw off the accuracy of the balance due to unequal expansion where the balance is subjected to a wide range of temperatures and therefore should ordinarily be avoided.

The invention claimed is:

1. A balance beam comprising a notched primary beam provided with two coextensive sets of graduations along the front face thereof opposite the notches, the notches opposite one set of graduations being larger than the notches opposite the other set, a secondary beam held in fixed relation to said primary beam and parallel thereto, and provided with a set of graduations, the three sets of graduations being correlated with each other, and a common pivot for both beams.

2. The combination of a notched balance beam provided with two coextensive sets of graduations along the front face thereof opposite the notches, the notches opposite one set of graduations being larger than the notches opposite the other set, and a pair of movable poises of unequal weight adapted to sit on the beam in said notches.

3. The combination of a notched balance beam provided with two coextensive sets of graduations along the front face thereof opposite the notches, the notches opposite one set of graduations being larger than the notches opposite the other set, and a pair of movable cylindrical poises of unequal weight adapted to sit on the beam in said notches.

4. The combination of a balance beam comprising a primary beam provided with two coextensive sets of graduations, a secondary beam held in fixed relation to said primary beam and parallel thereto, and provided with a set of graduations, the three sets of graduations being correlated with each other, a common pivot for both beams carried by said primary beam, with a pair of movable poises adapted to sit on the primary beam and a single poise adapted to sit on the secondary beam, and means on said primary beam for suspending weighing pans on opposite sides of said pivot but equidistant therefrom.

5. The combination of a balance beam comprising a primary beam provided with two coextensive sets of graduations, a secondary beam held in fixed relation to said primary beam and parallel thereto and provided with graduations along the front face thereof, said secondary beam being positioned so that the graduations thereon are above the upper edge of the primary beam, a common pivot for both beams carried by said primary beam, with a pair of movable poises adapted to sit on the primary beam and a single poise adapted to sit on the secondary beam, and means on said primary beam for suspending weighing pans on opposite sides of said pivot but equidistant therefrom.

6. In combination with a balance case, a balance beam pivoted therein comprising a primary beam along which a poise is movable, a movable poise adapted to sit on the primary beam, a secondary beam parallel to said primary beam and rigidly attached thereto and along which a poise is movable, a movable poise adapted to sit on the secondary beam, and a common pivot for both beams, and means for shifting said poises independently of each other along said primary and secondary beams operable from outside said case.

7. In combination with a balance case, a balance beam pivoted therein comprising a primary beam along which a poise is movable, a movable poise adapted to sit on the primary beam, a secondary beam parallel to said primary beam and rigidly attached thereto and along which a poise is movable, a movable poise adapted to sit on the secondary beam, and a common pivot for both beams, and means for shifting said poises independently of each other along said primary and secondary beams comprising a sliding rod adapted for rotation about its longitudinal axis and extending parallel to said beams and through one side of the balance case.

8. In combination with a balance case, a balance beam pivoted therein comprising a primary beam along which a poise is movable, a movable poise adapted to sit on the primary beam, a secondary beam parallel to said primary beam and rigidly attached thereto and along which a poise is movable, a movable poise adapted to sit on the secondary beam, and a common pivot for both beams, and means for shifting said poises independently of each other along said primary and secondary beams comprising a sliding rod adapted for rotation about its longitudinal axis and extending parallel to said beams and through one side of the balance case, a member rigidly carried by said rod adapted to engage and move a poise along one of said beams, a second member slidably and pivotally mounted on said rod adapted to engage and move a poise along the other of said beams and to be locked with said first member by manipulation of said rod for movement longitudinally of said balance beam, and for rotation about the longitudinal axis of said rod to bring said second member toward its poise engaging position.

9. In combination with a balance case, a balance beam pivoted therein comprising a primary beam, a movable poise adapted to sit on the primary beam, a secondary beam positioned to the rear of and parallel to said primary beam and rigidly attached thereto, a movable poise adapted to sit on the secondary beam, and a common pivot for both beams, and means for shifting said poises independently of each other along said beams comprising a sliding rod adapted for rotation about its longitudinal axis and extending parallel to said beams and through one side of the balance case, a support for said rod intermediate its inner end and said side of the balance case, a U-shaped member having its ends attached to said rod on either side of said support, a poise engaging member carried by said U-shaped member adapted to move a poise along said secondary beam, a second U-shaped member slidably and pivotally attached at its ends to said rod on either side of said support and adapted to be locked with said first U-shaped member by manipulation of said rod for movement longitudinally of said balance beam and about the longitudinal axis of said rod to bring said second U-shaped member toward its poise engaging position, and a second poise engaging member carried by said second U-shaped member adapted to move a poise along said primary beam.

10. In combination with a balance case, a balance beam pivoted therein comprising a primary beam, a movable poise adapted to sit on the primary beam, a secondary beam positioned to the rear of and parallel to said primary beam and rigidly attached thereto, a movable poise adapted to sit on the secondary beam, and a common pivot for both beams, and means for shifting said poises independently of each other along said beams comprising a sliding rod adapted for rotation about its longitudinal axis positioned to the rear of said beams and extending parallel thereto and through one side of the balance case, a support for said rod intermediate its inner end and one side of the balance case, a U-shaped member having its ends attached to the rod on either side of said support, a poise engaging member carried by said U-shaped member adapted to engage and move a poise along said secondary beam when said U-shaped member is in a forwardly extending position, a second U-shaped member slidably and pivotally attached at its ends to said rod on either side of said support and adapted to be locked with said first U-shaped member by manipulation of said rod for movement longitudinally of said beams and about the longitudinal axis of said rod to bring said second U-shaped member toward its poise engaging position, a second poise engaging member carried by said second U-shaped member adapted to extend over said rod and first U-shaped member to engage and move a poise along said primary beam when said second U-shaped member is in a forwardly extending position, the weight of said second U-shaped member being sufficient so that movement of said second poise engaging member about the longitudinal axis of said rod away from its poise engaging position is effected by gravity.

11. In combination with a balance case, a balance beam pivoted therein comprising a primary beam, a movable poise adapted to sit on the primary beam, a secondary beam positioned to the rear of and parallel to said primary beam and rigidly attached thereto, a movable poise adapted to sit on the secondary beam, and a common pivot for both beams, and means for shifting said poises independently of each other along said beams comprising a sliding rod adapted for rotation about its longitudinal axis positioned to the rear of said beams and extending parallel thereto and through one side of the balance case, a support for said rod intermediate its inner end and said side of the balance case, a U-shaped member having its ends attached to the rod on either side of said support, a poise engaging member carried by said U-shaped member adapted to engage and move a poise along said secondary beam when said U-shaped member is in a forwardly extending position, a second U-shaped member having its ends embracing said rod in a slidable and pivotal connection on either side of said support and intermediate the ends of said first U-shaped member and adapted to receive the adjacent arm of said first U-shaped member on manipulation of said rod for movement longitudinally of said beams and about the longitudinal axis of said rod to bring said second U-shaped member toward its poise engaging position, a second poise engaging member carried by said second U-shaped member adapted to extend over said rod and first U-shaped member to engage and move a poise along said primary beam when said second U-shaped member is in a forwardly extending position, the weight of said second U-shaped member being sufficient so that movement of said second poise engaging member about the longitudinal axis of said rod away from its poise engaging position is effected by gravity.

12. In combination with a balance case, a balance beam pivoted therein comprising a primary beam, a movable poise adapted to sit on the secondary beam, a secondary beam positioned to the rear of and parallel to said primary beam and rigidly attached thereto, a movable poise adapted to sit on the secondary beam, and a common pivot for both beams, and means for shifting said poises along said beams comprising a sliding rod adapted for rotation about its longitudinal axis positioned to the rear of said beams and extending parallel thereto and through one side of the balance case, a support for said rod intermediate its inner end and said side of the balance case, a U-shaped member having its ends attached to said rod on either side of said support, a poise engaging member carried by said U-shaped member adapted to engage and move a poise along said secondary beam when said U-shaped member is in a forwardly extending position, a forwardly projecting stop carried by said support adapted to limit the position of said poise engaging member with respect to said secondary beam by engaging said U-shaped member, a second U-shaped member slidably and pivotally attached at its ends to said rod on either side of said support and adapted to receive the adjacent arm of said first U-shaped member by manipulation of said rod for movement longitudinally of said beams and about the longitudinal axis of said rod to bring said second U-shaped member toward its poise engaging position, a second poise engaging member carried by said second U-shaped member adapted to extend over said rod and first U-shaped member to engage and move a poise along said primary beam when said second U-shaped member is in a forwardly extending position, a rearwardly projecting stop carried by said support on which said second U-shaped member is adapted to rest when said second poise engaging member is out of poise engaging position, the weight of said second U-shaped member being sufficient so that movement of said second poise engaging member about the longitudinal axis of said rod away from its poise engaging position is effected by gravity.

13. In combination with a balance case, a balance pivoted therein comprising a primary beam, a movable poise adapted to sit on the primary beam, a secondary beam of not greater length than said primary beam positioned to the rear of and parallel to said primary beam and rigidly attached thereto, a movable poise adapted to sit on the secondary beam, and a common pivot for both beams, and means for shifting said poises independently of each other along said beams comprising a sliding rod adapted for rotation about its longitudinal axis and extending parallel to said beams and through one side of the balance case, a support for said rod opposite the pivot of said balance beam, a U-shaped member having its ends attached to said rod on either side of said support, a poise engaging member carried at the center of said U-shaped member adapted to move a poise along said secondary beam, a second U-shaped member slidably and pivotally attached at its ends to said rod on either side of said support and intermediate the ends of said first U-shaped member, the distance between the ends of said second U-shaped member being approximately equal to the length of said primary beam, a second poise engaging member carried at approximately the center of said second U-shaped member adapted to move a poise along said primary beam, said second U-shaped member being adapted to receive the adjacent arm of said first U-shaped member by manipulation of said rod for movement longitudinally of said balance beam and about the longitudinal axis of said rod to bring said second poise engaging member toward its poise engaging position.

14. In combination with a balance case, a balance beam pivoted therein comprising a primary beam, a movable poise adapted to sit on the primary beam, a secondary beam positioned to the rear of and parallel to said primary beam and rigidly attached thereto, a movable poise adapted to sit on the secondary beam, and a common pivot for both beams, and means for shifting said poises independently of each other along said beams comprising a sliding rod adapted for rotation about its longitudinal axis positioned to the rear of said beams and extending parallel thereto and through one side of the balance case, a support for said rod intermediate its inner end and one side of the balance case, an elongated U-shaped member having its ends attached to the rod on either side of said support, a poise engaging member adapted to engage and move a poise along said secondary beam when said U-shaped member is in a forwardly extending position, a second elongated U-shaped member slidably and pivotally attached at its ends to said rod on either side of said support and intermediate the ends of said first U-shaped member, a second poise engaging member carried by said second U-shaped member extending over said first U-shaped member and secondary beam, said poise engaging member being divided into two arms extending downwardly on either side of said primary beam and then inwardly and upwardly to engage the under side of a poise projecting laterally of said beam to move it along said beam, said first U-shaped member extending further than said second U-shaped member from said rod so that when said first U-shaped member is raised by turning said rod it will engage said second poise engaging member and raise it toward its poise engaging position.

15. In combination with a balance case, a balance beam pivoted therein an elongated poise adapted to sit transversely on said beam and project laterally thereof, and means for shifting along said beam, said elongated poise comprising a sliding rod adapted for rotation about its longitudinal axis and extending parallel to said beam and through one side of the balance case, and a poise engaging member adapted to be actuated by said rod extending above said beam, said poise engaging member being divided into two arms extending downwardly and sloping inwardly on either side of said beam and then extending upwardly to engage the under side of said poise to move it along the beam, the distance between said sloping portions of the arms opposite the ends of said arms being slightly greater than the length of said poise whereby said poise is centered with respect to the beam on being lifted by said poise engaging member.

JACOB EMIL SEEDERER.